July 25, 1967     D. GOLDRYN     3,332,139
METHOD OF ASSEMBLING AN ADJUSTMENT DEVICE
FOR A TRIMMER CAPACITOR
Filed Nov. 5, 1964
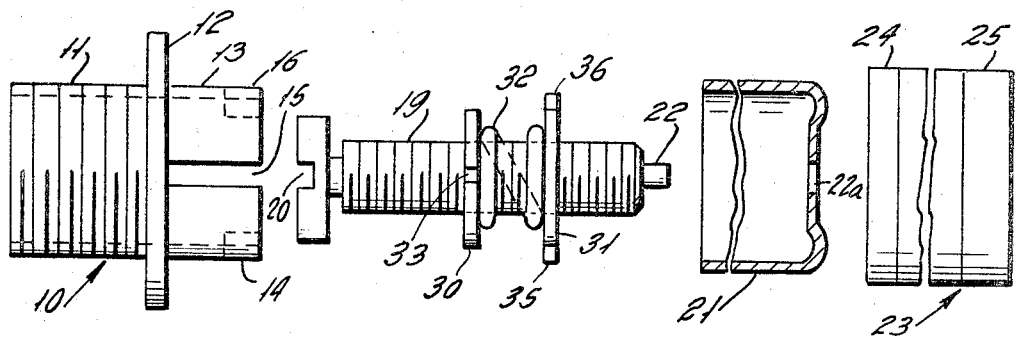
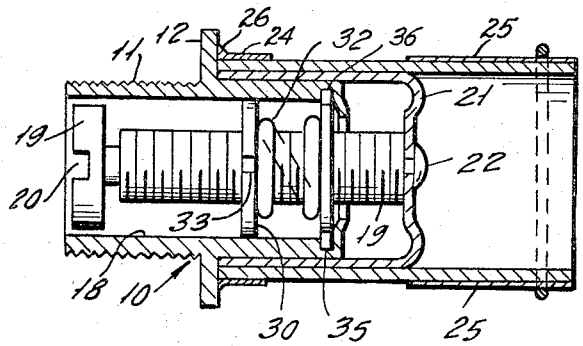
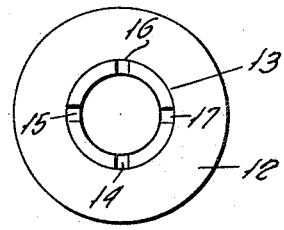
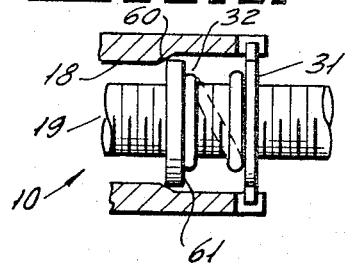
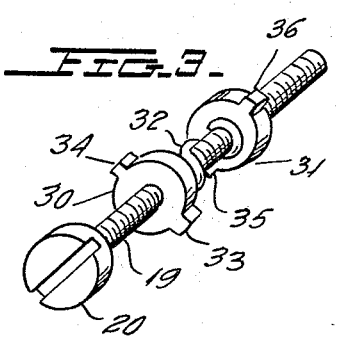
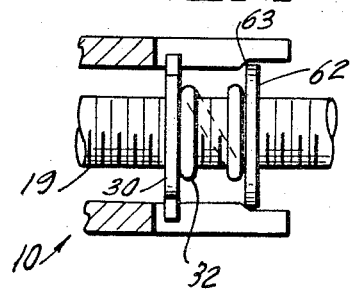
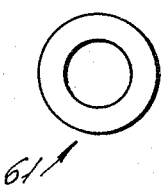
INVENTOR.
DAVID GOLDRYN
BY
OSTROLENK, FABER, GERB & SOFFEN
ATTORNEYS

United States Patent Office 3,332,139
Patented July 25, 1967

3,332,139
METHOD OF ASSEMBLING AN ADJUSTMENT DEVICE FOR A TRIMMER CAPACITOR
David Goldryn, Brooklyn, N.Y., assignor to Stratford Retreat House, White Plains, N.Y., a religious organization of New York
Filed Nov. 5, 1964, Ser. No. 409,267
4 Claims. (Cl. 29—436)

ABSTRACT OF THE DISCLOSURE

A method of assembling the adjustment mechanism of a trimmer capacitor with a predetermined torque by initially threading spaced nuts on the adjustment screw with a spring compressed between them to some predetermined force, and thereafter inserting the assembled screw nut and spring into a trimmer capacitor bushing and securing one of the nuts to the bushing.

---

This application is a continuation-in-part application of my copending application Ser. No. 225,311, filed Sept. 21, 1962, entitled "Electrical Reactor," now United States Patent 3,228,257, and more particularly relates to a novel method of assembly of a torque structure of an electrical reactor.

Electrical reactors of the type with which the present invention is concerned may be of the well-known trimmer capacitor type.

In such reactors an adjustment member such as a screw is rotated to move a piston with respect to one of the electrodes of the device whereby accurate adjustment can be obtained. In this adjustment system, a torque imparting means is necessary which will prevent backlash in the adjustment screw and will maintain a predetermined torque on the screw to prevent its accidental rotation.

There are many methods of arranging the torque adjustment means. Each of these require that the torque adjustment means such as a spring be assembled during the assembly of the main reactor structure. This creates many problems in the adjustment of the torque and causes many delays and extra expense in the production of such devices.

The present invention provides a novel method of assembly of a torque device which is independent of the main assembly and is sub-assembled and adjusted on the adjustment screw prior to the assembly of the main reactor device thereby providing flexibility of production.

Accordingly, a primary object of this invention is to provide a novel method of assembly of a trimmer capacitor.

Another object of this invention is to provide a novel method of assembly of a trimmer capacitor which simplifies the torque adjustment for the reactor so that torque can be set at any level.

These and other objects will become apparent from the following description when taken in connection with the drawings, in which:

FIGURE 1 shows an exploded plan view partially in cross-section of a reactor adapted with the novel torque adjustment device of the invention.

FIGURE 2 shows a partial cross-sectional view of the reactor of FIGURE 1 when assembled.

FIGURE 3 shows a perspective view of the subassembled screw and torque adjustment device.

FIGURE 4 shows a front view of the bushing which receives the torque controlling device.

FIGURE 5 shows a partial view of an alternate form of the main bushing which receives a circular interior nut in a pressed fit.

FIGURE 6 is a plan view of the circular nut of FIGURE 5.

FIGURE 7 is similar to FIGURE 5, but illustrates the manner in which the outer nut may be press-fitted into the main bushing body.

Referring now to FIGURES 1 through 4, the reactor shown therein is of the standard type and comprises a mounting bushing 10 which can have a threaded surface 11 which may receive a nut which can tighten an electrical lead against the mounting flange 12 which extends from bushing 10 or provide connection directly to a mounting panel.

Bushing 10 has a further extending portion 13 which extends beyond the right-hand surface of flange 12.

As best seen in FIGURE 4, extending bushing portion 13 has four slots 14, 15, 16 and 17 therein. The bushing 10, as best seen in FIGURE 2, then has an opening 18 therethrough for receiving an adjustment screw 19 which has a slotted head 20 which can receive an adjustment tool such as a screwdriver. The right-hand end of screw 20 then receives a conductive adjustment piston 21 in any manner as by spot welding to extending end 22 of screw 10, as illustrated in FIGURE 2.

A dielectric cylinder 23 having conductive band 24 and electrode 25 is then secured to flange 12 as by soldering at solder portions 26, shown in FIGURE 2.

It will be apparent that by axially displacing piston 21 with respect to electrode 25 adjustment of capacitance between a lead connected to bushing 10 and a lead connected to electrode 25 can be obtained.

In order to provide a torque which must be overcome by screw 10, a novel torque assembly is provided for the reactor which includes nuts 30 and 31 which are threaded on screw 19 and a compression spring 32 which is captured between nuts 30 and 31.

Each of nuts 30 and 31 have diametrically opposite extending ears 33–34 and 35–36. When the capacitor is assembled, the ears 33 and 34 will be slidably received in grooves 15 and 17, respectively, of bushing portion 16 (FIGURE 4). The ears 35 and 36 of nut 31 may then be received in slots 14 and 16 of extending bushing portion 13 by a press fit to insure good electrical contact. Moreover, where extending ears and cooperating slots are used, an increase in the number of ears and slots used increases the sensitivity of the torque adjustment.

In order to retain the nuts 30 and 31 in a predetermined position with respect to bushing portion 13, a portion of the right-hand end of bushing portion 13 is rolled over tension nut 31 as illustrated by rolled over section 40 shown in FIGURE 2. Any similar fastening could be used in place of the rolled over portion such as brazing or the like.

When the reactor is assembled, as illustrated in FIGURE 2, it will be apparent that rotation of screw 19 will cause the screw to advance or retract with respect to bushing 10 to thereby move piston 21 along the axis of dielectric form 23 to thereby adjust the capacitance of the device.

The nut 31 which is captured at the end of bushing 13 serves as the support for the screw 19 with the enlarged head portion 20 fitting closely within opening 18 to permit linear motion of the screw along the axis of the device.

One particular advantage of the invention lies in the manner in which it simplifies assembly of the device. Thus, the screw 19, nuts 30 and 31, and spring 32 may be sub-assembled independently of the main assembly, as illustrated in FIGURE 3.

Referring to FIGURE 3, the nut is first threaded on screw 19. The spring 32 is thereafter slid over the end of screw 19 and thereafter screw 31 is threaded onto screw 19. The nuts 31 and 30 are then adjusted with respect to one another until the desired compression of spring 32 is achieved when the nuts are in a position where a line through ears 33 and 34 is perpendicular to a line through ears 35 and 36.

Note that the relationship of the ears and number of ears be such that they will register with whichever relationship exists between slots such as 14 through 17 in bushing portion 13.

Thereafter, the completely adjusted torque controlling device including the screw 19 is inserted into bushing 10 and is retained in that position as by rolling over end bushing portion 19 which captures nut 31 or in any other desired manner. The shell or piston 21 is thereafter put into position with extending portion 22 extending through opening 22a in the piston end and the portion 22 and piston 21 are connected together as by welding.

The dielectric form 23 which may be of glass is then connected to mounting bushing 10 by soldering or cementing from flange 12 to metallic band 24 which is deposited on dielectric form 23.

Because of this novel independent torque adjusting mechanism, it will now be apparent that the assembly techniques are simplified since the torque has been preset for the assembly of the device.

It has been further found that this type of structure leads to a long life mechanism having low wear characteristics as compared to conventional split bushing arrangements.

While FIGURES 1 through 4 require the two nuts 30 and 31 to each have extending tabs, alternative arrangements may be used whereby at least one of the nuts is directly connected to the bushing body, while the other of the nuts is free to traverse axially with respect to the bushing body without rotating with respect thereto.

Thus, while FIGURE 2 illustrates nut 31 being secured to the bushing body by staking, the interior nut 30 could have been secured to the bushing body.

This type arrangement is illustrated in FIGURE 5 which is substantially identical to FIGURE 2 with the exception that the opening 18 in bushing body 10 has a partially conical surface portion 60 which receives a nut 61 (FIGURE 6) which replaces original nut 30 in a pressed fit-type-engagement. The outer nut 31 is identical to those described in FIGURES 1 through 4, and captures the same spring 32 of FIGURES 1 through 4 between itself and the now connects the subassembly including screw 19 to bushing 10, the nut 31 will not be staked to the bushing body, but must be left free in an axial direction and can move axially within the slotted bushing section.

While FIGURES 5 and 6 illustrate the use of a circular interior nut 61, it will be apparent that the interior nut can be identical to nut 30 in FIGURES 1 through 4, and have extending tabs received in the slotted bushing portion, while the outer nut is formed of a circular nut 62, shown in FIGURE 7, which is press-fitted into a conical portion 36 of bushing 10. Note that in FIGURE 7, the conical section could be removed and any other type of press-fitting or spot-welding arrangement could be used to secure the circular nut 62 to the bushing 10.

A further advantage of the use of circular nuts rather than two nuts having extending tabs is that an almost infinite adjustment range is provided for the compression of spring 32, since no discrete relationship between the tabs of the two nuts is required.

Although this invention has been described with respect to its preferred embodiments, it should be understood that many variations and modifications will now be obvious to those skilled in the art, and it is preferred therefore that the scope of the invention be limited not by the specific disclosure herein but only by the appended claims.

The embodiments of the invention in which an exclusive privilege or property is claimed are defined as follows:

1. The method of assembling an adjustment device for a trimmer capacitor comprising the steps of threading a first nut on an adjustment screw, placing a compression spring on said adjustment screw, threading a second nut on said adjustment screw and capturing said compression spring between said first and second nut, compressing said compression spring between said first and second nut until a predetermined torque is required to rotate said screw with respect to said first and second nuts, and thereafter inserting said screw through a support bushing opening and thereafter connecting the subassembly of said adjustment screw, compression spring and first and second nuts to a support bushing by rigidly connecting one of said first and second nuts directly to said support bushing.

2. The method of assembling an adjustment device for a trimmer capacitor comprising the steps of threading a first nut on an adjustment screw, placing a compression spring on said adjustment screw, threading a second nut on said adjustment screw and capturing said compressing spring between said first and second nut, compressing said compression spring between said first and second nut until a predetermined torque is required to rotate said screw with respect to said first and second nuts, and thereafter inserting said screw through a support bushing opening and thereafter connecting the subassembly of said adjustment screw, compression spring and first and second nuts to a support bushing by sliding extending tabs of one of said first and second nuts into cooperating slot means on the interior of said bushing and rigidly connecting the other of said first and second nuts directly to said bushing.

3. The method substantially as set forth in claim 2 wherein said other of said first and second nuts is secured to said bushing by the method of staking.

4. The method substantially as set forth in claim 2 wherein said other of said first and second nuts is secured to said bushing by press-fitting.

References Cited
UNITED STATES PATENTS

| | | | |
|---|---|---|---|
| 2,490,594 | 12/1949 | Madden | 29—525 X |
| 2,607,826 | 8/1952 | Barnes | 74—424.8 X |
| 2,648,123 | 8/1953 | Phillips | 29—511 |
| 3,071,716 | 1/1963 | Young | 317—249 |
| 3,074,292 | 1/1963 | Polmon. | |
| 3,228,257 | 1/1966 | Goldryn | 74—424.8 |

CHARLIE T. MOON, *Primary Examiner.*